United States Patent
Holfelder et al.

(10) Patent No.: US 11,952,797 B2
(45) Date of Patent: Apr. 9, 2024

(54) BREAKTHROUGH RESISTANT DRYWALL STRUCTURE

(71) Applicant: KNAUF GIPS KG, Iphofen (DE)

(72) Inventors: Klaus Holfelder, Iphofen (DE); Ruth Schnobrich, Würzburg (DE); Klaus Wandler, Rödelsee (DE)

(73) Assignee: KNAUF GIPS KG, Iphofen (DE)

(*) Notice: Subject to any disclaimer, the term of this patent is extended or adjusted under 35 U.S.C. 154(b) by 395 days.

(21) Appl. No.: 17/414,268

(22) PCT Filed: Dec. 19, 2018

(86) PCT No.: PCT/EP2018/000568
§ 371 (c)(1),
(2) Date: Jun. 15, 2021

(87) PCT Pub. No.: WO2020/125915
PCT Pub. Date: Jun. 25, 2020

(65) Prior Publication Data
US 2022/0056724 A1    Feb. 24, 2022

(51) Int. Cl.
*E04H 9/04* (2006.01)
*E04B 1/76* (2006.01)
*E04B 2/58* (2006.01)

(52) U.S. Cl.
CPC .......... *E04H 9/04* (2013.01); *E04B 1/7662* (2013.01); *E04B 2/58* (2013.01)

(58) Field of Classification Search
CPC . E04H 9/04; E04H 9/10; E04B 1/7662; E04B 2/58; E04B 1/80; E04B 2001/742; E04B 2001/745; E04B 2002/7477; E04B 2/7457; Y02A 30/244
See application file for complete search history.

(56) References Cited

U.S. PATENT DOCUMENTS

| 4,947,611 A * | 8/1990 | Otsuka ..................... E04C 2/16 521/154 |
| 6,641,909 B1 | 11/2003 | Wasylciw |
| 6,774,161 B2 * | 8/2004 | Hashemzadeh ............ C08J 5/04 524/556 |

(Continued)

FOREIGN PATENT DOCUMENTS

| DE | 202004017223 U1 | 3/2005 | |
| DE | 102010020989 A1 * | 11/2011 | ........... E04B 2/7457 |

(Continued)

OTHER PUBLICATIONS

International Search Report and Written Opinion received for PCT/EP2018/000568, dated Sep. 5, 2019.

(Continued)

*Primary Examiner* — Rodney Mintz
(74) *Attorney, Agent, or Firm* — Greer, Burns & Crain, Ltd

(57) ABSTRACT

Breakthrough resistant drywall structure, classified at least for resistance class 2 according to DIN EN 1627 from September 2011, having at least two studs arranged to form a drywall substructure, each stud including a base portion and at least one flange portion, the drywall structure further having a plurality of building panels attached to the at least one flange portion, the drywall structure 1 further including a filling material, wherein the filling material comprises fibers.

19 Claims, 2 Drawing Sheets

(56) References Cited

U.S. PATENT DOCUMENTS

| | | | |
|---|---|---|---|
| 7,637,073 B2* | 12/2009 | Elliott | F41H 5/04 |
| | | | 52/DIG. 9 |
| 10,598,466 B2* | 3/2020 | Zehnter | F41H 5/04 |
| 10,661,473 B2* | 5/2020 | Renke | E04B 2/707 |
| 11,002,033 B2* | 5/2021 | Pospisil | E04B 2/56 |
| 11,131,091 B2* | 9/2021 | Herfurth | E04B 2/7457 |
| 11,732,404 B2* | 8/2023 | Sirejacob | C04B 16/10 |
| | | | 428/378 |
| 2003/0151158 A1 | 8/2003 | Hashemzadeh et al. | |
| 2007/0245933 A1* | 10/2007 | Kramer | F41H 5/24 |
| | | | 109/49.5 |
| 2008/0010932 A1 | 1/2008 | Elliot et al. | |
| 2016/0024799 A1 | 1/2016 | Pollack | |
| 2017/0268232 A1* | 9/2017 | Renke | E04B 2/707 |
| 2019/0113311 A1* | 4/2019 | Zehnter | E04F 13/12 |
| 2019/0211550 A1* | 7/2019 | Herfurth | E04B 2/7409 |
| 2020/0256078 A1* | 8/2020 | Pospisil | E04H 9/06 |
| 2020/0283950 A1* | 9/2020 | Sirejacob | C04B 28/02 |
| 2023/0008578 A1* | 1/2023 | Seidel | E04B 1/82 |

FOREIGN PATENT DOCUMENTS

| | | |
|---|---|---|
| EP | 2703575 A1 | 3/2014 |
| FR | 2844816 B1 | 4/2008 |
| FR | 2994988 A1 | 3/2014 |
| GB | 2283256 A | 5/1995 |

OTHER PUBLICATIONS

Office Action received in Canadian Application No. 3,119,660, dated Feb. 9, 2023.

Office Action received in European Application No. 18833166.4 dated Sep. 26, 2023.

* cited by examiner

BREAKTHROUGH RESISTANT DRYWALL STRUCTURE

BACKGROUND

The invention relates to the technical field of burglar resistant drywall structures in particular to drywall structures having a defined resistance time against burglary attempts so that they provide an obstacle against breakthrough for a predetermined time by use of a predetermined selection of tools.

Burglary resistance performance of a drywall construction can be tested and is ranked in different classes of resistance. Such a test consists of dynamic shock performance, static punctual load performance and a manual burglary attempt. The manual burglary attempt measures the breakthrough time by use of specific different selection tools. Within the breakthrough time, no sufficiently large access opening is allowed to be created to pass the test. The minimum dimensions of the access opening are by definition 400 mm (15.75 inches)×250 mm (9.84 inches).

For example in resistance class 2 (RC 2—according to DIN EN 1627 from September 2011) tools with little effect for the drywall construction, such as small water pump pliers (length max 250 mm (9.84 inches)), screwdriver with a maximum length of 365 mm (14.37 inches) and rubber mallet are used and the "breakthrough time" is 3 minutes in total.

In resistance class 3 (RC 3—according to DIN EN 1627 from September 2011) in addition to the above tools an additional locksmith hammer weighing 200 g (0.44 pounds) and a length of 300 mm (11.81 inches) and a crowbar (cow foot) with a length of 71 cm (27.95 inches) is added to the RC 2 selection of tools and the "breakthrough time" increases to 5 min.

To accomplish resistance class 4 (RC 4—according to DIN EN 1627 from September 2011), to the above tools an ax (length 350 mm (13.78 inches)), a tin snips (length 260 mm (10.24 inches)), a bolt cutter (Length 460 mm (18.22 inches)) and a sledgehammer with a weight of 1.25 kg (2.20 Lbs) and a chisel with a length of 250 mm (9.84 inches) are added and the "breakthrough time" increases to 10 min.

Common burglar resistant drywall constructions achieve, depending on the design, the resistance classes 1 to 3 according to DIN EN 1627 from September 2011. Resistance class 3 can be achieved by use of standard drywall boards with a multilayer arrangement or by use of thicker boards (thicknesses of 15 mm (0.59 inches) or 18 mm (0.71 inches)). In such drywall constructions, it is known to use additional obstruction of metal sheets or laminating of gypsum plates with sheet metal. A particular disadvantage is that the resistance class 4 cannot be achieved by those drywall constructions.

However, since such resistant drywall constructions can be used as well for prisons, the expression "breakthrough" in the context of the present invention should be understood as breaking into a room or building or breaking out of a room or building.

The object of the invention is therefore to provide a breakthrough resistant drywall structure which overcomes or at least reduces the disadvantages known from the prior art and in particular to allow for an easy, fast and cheap construction while having maximum breakthrough resistance performance.

SUMMARY

The invention comprises a breakthrough resistant drywall structure, classified at least for resistance class 2 according to DIN EN 1627 from September 2011. A breakthrough resistant drywall structure is a drywall structure, wherein the drywall structure is capable of forming a resistance to a tool used for breaking through the drywall structure. The breakthrough resistant drywall structure comprises at least two studs arranged to form a drywall substructure. Each stud comprises a base portion and at least one flange portion. Different forms of studs, which are known to the skilled person are possible, e.g. studs in C-shape or U-shape or M-shape or others. The breakthrough resistant drywall structure may further comprise a plurality of building panels attached to the at least one flange portion. The breakthrough resistant drywall structure may further comprise a filling material. The filling material comprises fibers. The filling material is capable of forming a resistance to a tool used for breaking through the drywall structure.

In a preferred aspect of the invention the inventive breakthrough resistant drywall structure is classified at least for resistance class 3 according to DIN EN 1627 from September 2011. In an especially preferred aspect of the invention the inventive breakthrough resistant drywall structure is classified at least for resistance class 4 according to DIN EN 1627 from September 2011.

This construction surprisingly allows for an easy construction, which can be quickly mounted and a maximum breakthrough resistance performance. This is because less material is used (especially less (expensive) metal sheets for reaching a similar/equal resistance class) and the material used is easier to handle like fibrous filling material instead of metal sheets that need to be cut with to fit. Thus, less costs are generated. Further, the weight of the breakthrough resistant drywall structure is lower than the weight of drywall structures of the state of the art (for similar/equal resistance class) because less (heavy) material is used. Moreover, an insulation effect of the filling material is obtained as well, which may just be slightly dependent on the choice of the filling material. It has to be mentioned though, that a breakthrough resistance performance cannot be achieved with insulation material like mineral wool.

The fibers in the filling material provide an obstacle to the tools used for testing the burglary resistance performance. The fibers can be arranged as filament, in particular of endless fibers. The filling material is preferably of a predetermined toughness, which allows for absorbing energy and plastically deform without fracturing by use of the tools used when testing burglary resistance performance. Toughness requires a balance of strength and ductility. The strain to rupture may be preferably in the range of 1% to 2.7%. The tensile strength of the fibers may be preferably in the range of 300 to 1500 MPa (43.5 to 217.6 Ksi), in particular 390 to 1200 MPa (56.6 to 170.1 Ksi). The elastic modulus of the fibers may be in the range of from 20 GPa to 300 GPa (2901 to 43511 Ksi), preferably of from 30 GPa to 200 GPa (4351 to 29007 Ksi), more preferably of from 40 GPa to 150 GPa (5801 to 21756 Ksi). In an especially preferred embodiment, the fibers may have a tensile strength of from 1000 MPa to 1200 MPa (145.0 to 170.1 Ksi) and an elastic modulus of from 65 GPa to 110 GPa (9427 to 15954 Ksi). The ratio between the elastic modulus and the tensile strength of the filling material may be between about 200:1 and 67:1, preferably between about 120:1 and 180:1. Preferably, the fiber material is capable of forming a felt (preferably with thin fibers and/or fibrils). This means that no effort is necessary to produce a woven mesh, which is lowering the producing costs. However, a woven or non-woven mesh is possible, too. The fibers may comprise a rough surface to allow (when a force is applied) for an entanglement with other fibers to form a bulk filling material, which makes it even more difficult for a tool to break through.

According to a technically preferred aspect, the filling material comprises natural fibers or synthetic fibers or a combination of natural fibers and synthetic fibers. The natural fibers may be for example hemp fibers, jute fibers, kenaf fibers, ramie fibers or flax fibers, or any combination thereof and the synthetic fibers may be for example nylon fibers, polyester fibers, bico fibers, PPBO fibers or aramid fibers, or any combination thereof. Preferably, the filling material may comprise hemp fibers and/or bico fibers.

Another preferred aspect relates to that the filling material comprises fibers of a mean length in the range of 2 mm to 280 mm (0.08 to 11.02 inches), preferably in the range of 5 mm to 140 mm (0.20 to 5.51 inches), more preferably in the range of 10 to 100 mm (0.39 to 3.94 inches), and/or wherein the filling material comprises fibers of a mean diameter in the range of 2 µm to 150 µm (0.00008 to 0.006 inches), preferably in the range of 3 µm to 60 µm (0.0001 to 0.002 inches). Those dimensions are in case of naturals fibers particularly preferred.

Synthetic fibers, however, can be produced in many desired length and diameter dimensions, which is known to the person skilled in the art.

PPBO (Zylon) fibers, for example, are known to be made from Poly(p-phenylen-2,6-benzobisoxazol) and are very strong. Those fibers are capable of resisting temperatures of up to 650° C. (1202° F.) and only burning at oxygen levels above 68%. Aramid fibers are known to be made from polyamide in which the amide groups are bound to aromatic groups and they are very strong. Those fibers are capable of resisting temperatures of up to 370° C. (698° F.).

Advantageously, the filling material comprises hemp fibers, bico fibers, polyester fibers, aramid fibers and/or PPBO fibers. Test results for burglary resistance performance have shown that a fiber mat comprising hemp fibers can be used to increase the "breakthrough time".

Advantageously, the filling material may comprise a fiber mat. A fiber mat according to this invention is a mat comprising fibers, preferably comprising hemp fibers, jute fibers, flax fibers, kenaf fibers, ramie fibers, polyester fibers, bico fibers nylon fibers, aramid fibers and/or PPBO fibers or any combinations thereof, preferably hemp fibers and/or bico fibers. The fiber mat may have a density of from 10 to 500 kg/m$^3$ (0.62 to 31.21 lbs/ft$^3$), preferably of from 20 to 400 kg/m$^3$ (1.25 to 24.97 lbs/ft$^3$), more preferably of from 30 to 300 kg/m$^3$ (1.87 to 18.73 lbs/ft$^3$) and/or a thickness in the range of from 20 mm to 200 mm (0.79 to 7.87 inches), preferably of from 40 mm to 150 mm (1.57 to 5.91 inches), more preferably of from 50 mm to 100 mm (1.97 to 3.94 inches).

Preferably, a fiber mat in the context of the invention may comprise hemp fibers. However, if a fiber mat comprises hemp fibers it may usually comprise as well (for production reasons and cost reasons) hemp hurds (also called hemp wood, which means the wooden pieces of a hemp plant). Preferably, such a fiber mat comprises hemp fibers and hemp hurds, preferably equal amounts of hemp fibers and hemp hurds.

In the preferred aspect of the invention that the filling material comprises a fiber mat, it is especially preferred that bico fibers in combination with hemp fibers, jute fibers, flax fibers, kenaf fibers, ramie fibers, polyester fibers, nylon fibers, aramid fibers and/or PPBO fibers or any combinations thereof, preferably with hemp fibers are used. Especially preferred is a fiber mat, comprising hemp fibers and bico fibers. Even more preferred is a fiber mat, comprising hemp fibers, hemp hurds and bico fibers.

Bico fibers, which are known to the person skilled in the art, are usually made of two polymers with different melting points, for example two polyester with different melting points, wherein the polymer with the lower melting point is wrapped around the polymer with the higher melting point in form of a fiber. When heated up to a temperature where only the polymer with the lower melting point is melting, for example in a mixture with other fibers, which do not melt at that temperature, for example hemp fibers, only the polymer with the lower melting point is melted. Thus, it is able to relocate for example in the form of a drop from the fiber it was wrapped around, for example to a crossing with another fiber, being either another bico fiber or for example a hemp fiber. Then, after cooling down again, the drop is hard again and now connects the two fibers at their crossing point.

The above-mentioned process may happen everywhere in the filling material when heated up to a temperature where only the polymer with the lower melting point is melting so that a network with uncountable connections can be established.

The two polymers with different melting points may each be of polyester, polyethylene, polypropylene, polylactide or any other polymers known by the skilled person suitable for the above-mentioned purpose. When polylactides are used, a further advantage lies in the fact that for example a fiber mat produced only with hemp fibers, hemp hurds and polylactides is compostable, which nowadays might be a critical feature for selling a product. In a preferred aspect, a fiber mat may comprise around 45% by weight of hemp hurds, around 45% by weight of hemp fibers and around 10% by weight of bico fibers.

Surprisingly, a filling material comprising a fiber mat comprising a combination of bico fibers with other fibers as mentioned above, preferably hemp fibers, results in a breakthrough resistant drywall structure with a very high breakthrough resistance performance.

In the preferred aspect of the invention that the filling material comprises a fiber mat, it is further possible to include a flame retardant, like for example ammonium phosphate.

Preferably, the fiber material comprises a binder material or no binder material. A binder material can be an adhesive, a synthetic resin emulsion or a calcium cement material.

Preferably, the breakthrough resistant drywall structure according to the invention may be classified at least for resistance class 3 according to DIN EN 1627 from September 2011, preferably classified at least for resistance class 4 according to DIN EN 1627 from September 2011.

Another advantageous aspect relates to that the plurality of building panels is arranged in two or more layers, each layer being directly or indirectly attached to the at least one flange portion. In particular in case of gypsum plasterboards, additional layers can be easily attached by screws which extend through both layers into the flange portion.

According to another advantageous aspect, a sheet metal layer is arranged in between of the respective building panel and the flange portion to which the building panel is attached. The sheet metal allows to further increase the resistance against the above mentioned tools for use in a burglary attempt.

Preferably, the sheet metal layer has a thickness in the range of from 0.2 mm to 0.5 mm (0.008 to 0.02 inches), preferably of from 0.3 to 0.4 mm (0.012 to 0.016 inches).

Another advantageous aspect relates to that the breakthrough resistant drywall structure may further comprise an inner building panel which is attached to the filling material so as to extend between the base portions of adjacent drywall profiles. In a specific example, the inner building panel may be a gypsum plasterboard to which the filling material adheres at one side. However, other building panels like (gypsum) fiberboards are possible, too.

Advantageously, the stud has two flange portions and a base portion, preferably the base portion having a width in the range of 50 mm to 150 mm (1.97 to 5.91 inches), more preferably in the range of 75 mm to 100 mm (2.95 to 3.94 inches). This allows a drywall construction having suitable space between the attached building panels to arrange the filling material therein.

It is particularly preferred if the building panel is a gypsum plasterboard, preferably a gypsum plasterboard of a thickness in the range of 9 mm to 25 mm (0.35 to 0.98 inches), preferably of 10 mm to 15 mm (0.39 to 0.59 inches). This allows for applying the advantages concerning burglary resistance to the widely used construction method for gypsum plasterboards. However, (gypsum) fiberboards and other building panels are possible as well.

According to another aspect of the invention, the filling material is arranged between the base portions of adjacent studs. The filling material is capable of forming a resistance to a tool used for breaking through the drywall structure. The filling material may be cut exactly to the width between adjacent studs and pushed there between the two adjacent studs to fill completely the space between the studs to be capable of forming a resistance to a tool used for breaking through at any section of the drywall construction.

A further aspect of the invention relates to a kit for building a breakthrough resistant wall, comprising at least two breakthrough resistant drywall structures as described herein.

Another aspect of the invention relates a breakthrough resistant wall, comprising a plurality of breakthrough resistant drywall structures (1) as described herein.

Another aspect of the invention relates to a use of a breakthrough resistant drywall structure as described above, a kit for building a breakthrough resistant wall or a breakthrough resistant wall for avoiding breaking through.

BRIEF DESCRIPTION OF THE DRAWINGS

In the following, the invention will be explained in more detail with reference to drawings. Like reference numerals denote similar features throughout the drawings. In the drawings is.

DETAILED DESCRIPTION

Figure 1:
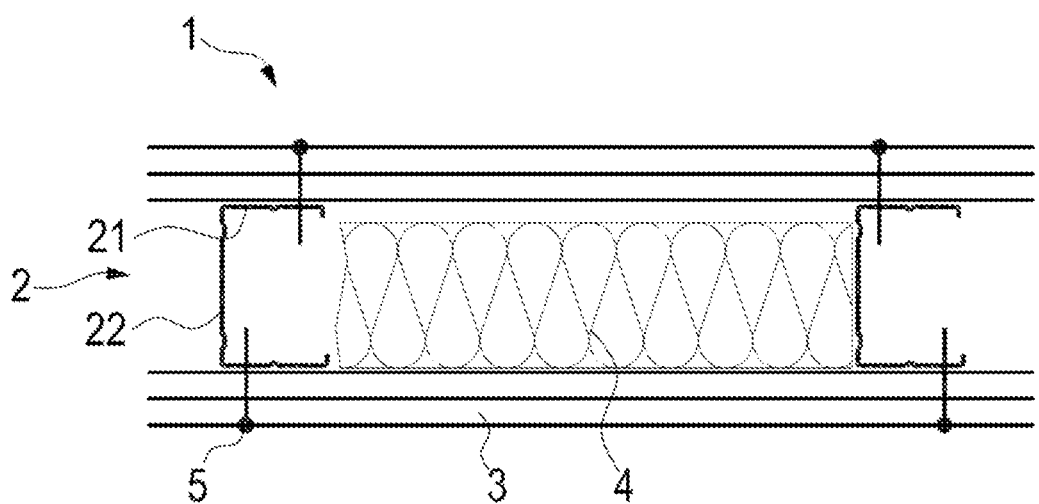
FIG. 1 a breakthrough resistant drywall structure according to the invention comprising a filling material capable of forming a resistance to a tool.

FIG. 1 illustrates a breakthrough resistant drywall structure 1 according to the invention, which is capable of forming a resistance to a tool used for breaking through the breakthrough resistant drywall structure 1, in particular to a tool used in a test of burglary resistance performance.

The shown breakthrough resistant drywall structure 1 is a section of a bigger breakthrough resistant drywall structure (not shown) where only two studs 2 made of C-shaped metal material can be seen. The studs 2 are arranged to form a breakthrough resistant drywall substructure consisting of a plurality of studs 2, which are arranged as wall. Each stud 2 in this FIG. 1 has a base portion 22 and two flange portions 21. The two flange portions 21 of the stud 2 are arranged in a distance of 100 mm, which is the width of the base portion 22 in the shown example.

The breakthrough resistant drywall structure 1 comprises a plurality of building panels 3 attached to each flange portion 21. The building panels 3 are arranged in two layers, which are pairwise attached to the respective flange portion 21 with fastening means 5, e.g. screws. The building panel 3 is a gypsum plasterboard having a thickness of 12.5 mm (0.49 inches).

According to the invention, the breakthrough resistant drywall structure 1 further comprises a filling material 4 arranged in between of two adjacent studs, i.e. in between the base portions 22 of adjacent studs 2. The filling material 4 comprises fibers to be capable of forming a resistance to a tool used for breaking through the breakthrough resistant drywall structure 1. The fibers in the filling 4 material provide an obstacle to the tools used for testing the burglary resistance performance, wherein the filling material 4 allows for an easy to mount construction of the breakthrough resistant drywall structure 1.

The filling material 4 comprises natural fibers or synthetic fibers or a combination of natural fibers and synthetic fibers.

In the shown example, the filling material 4 is made of a fiber mat comprising hemp fibers, hemp hurds and bico fibers, preferably a fiber mat having a density of 130 Kg/m$^3$ (8.12 lbs/ft$^3$). The fiber mat is exemplified with a thickness of 60 mm (2.36 inches).

The breakthrough resistant drywall structure according to FIG. 1 passes the test for the qualification to resistance class 3 according to DIN EN 1627 from September 2011.

Figure 2:
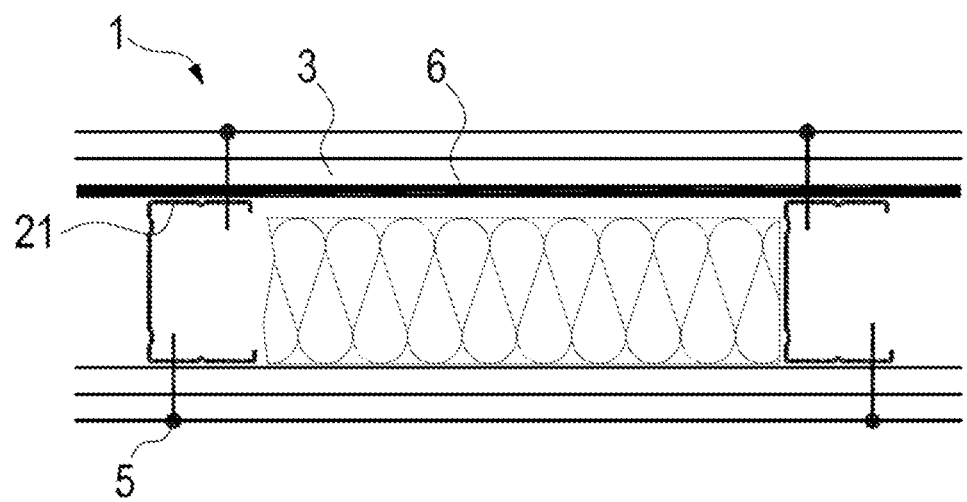
FIG. 2 the breakthrough resistant drywall structure of FIG. 1 which includes a sheet metal layer capable of forming an additional resistance to a tool used for breaking through the drywall structure.

In FIG. 2 the breakthrough resistant drywall structure 1 of FIG. 1 has been amended to include a sheet metal layer 6 arranged in between of the respective building panel 3 and the flange portion 21 to which the building panel 3 is attached. The sheet metal layer 6 has a thickness of 0.3 mm (0.01 inches). In difference to the shown representation, an additional the sheet metal layer can be attached to the other flange portion 21 of the respective stud so that the drywall construction includes two sheet metal layers. However, it is also possible to include more than two sheet metal layers.

The breakthrough resistant drywall structure according to FIG. 2 passes the test for the qualification to resistance class 4 according to DIN EN 1627 from September 2011.

Figure 3:
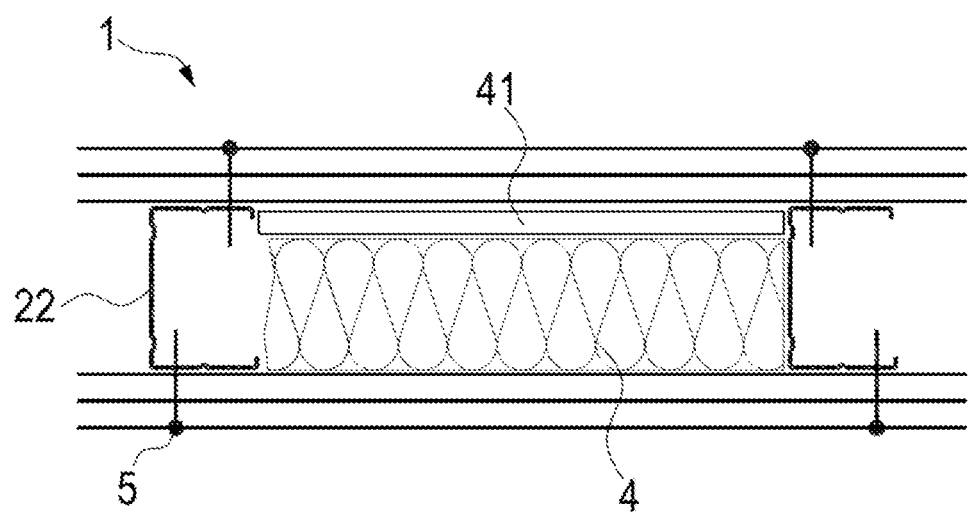
FIG. 3 a breakthrough resistant drywall structure having an inner building panel attached to the filling material capable of forming an additional resistance to a tool used for breaking through the drywall structure.

In FIG. 3 the breakthrough resistant drywall structure 1 is depicted to further comprise an inner building panel 41 which is attached, preferably glued, to the filling material 4 so as to extend between the base portions 22 of adjacent drywall profiles 2. The inner building panel 41 allows to further increase the strength while being easy to mount together with the filling material 4. The inner building panel may be a gypsum plasterboard or a gypsum fiberboard. The structure 1 with an inner building panel 41 can be combined with sheet metal layers (e.g. as depicted in FIG. 2).

While a particular embodiment of a breakthrough resistant drywall structure has been described herein, it will be appreciated by those skilled in the art that changes and modifications may be made thereto without departing from the invention in its broader aspects and as set forth in the following claims.

The invention claimed is:

1. A breakthrough resistant drywall structure, comprising:
at least two studs arranged to form a drywall substructure, each stud including a base portion and at least one flange portion; the drywall structure further comprising a plurality of building panels attached to the at least one flange portion; the drywall structure further comprising a filling material; and, the filling material comprises a fiber mat comprised of hemp fibers; the drywall structure further comprising a discrete inner building panel which is glued to the fiber mat so as to extend between the base portions of the at least two studs, wherein the fiber mat and the inner building panel collectively define a breakthrough resistant element.

2. The breakthrough resistant drywall structure according to claim 1, wherein the fibers have a tensile strength of from 300 MPa (43.5 Ksi) to 1500 MPa (217.6 Ksi), wherein the filling material has a tensile strength of from 1000 MPa (145.0 Ksi) to 1200 MPa (170.1 Ksi) and an elastic modulus of from 65 GPa (9427 Ksi) to 110 GPa (15954 Ksi).

3. The breakthrough resistant drywall structure according to claim 1, wherein at least one of: the filling material comprises fibers of a mean length in the range of 2 mm (0.08 inches) to 280 mm (11.02 inches), or the filling material comprises fibers of a mean diameter in the range of 2 μm (0.00008 inches) to 150 μm (0.006 inches).

4. The breakthrough resistant drywall structure according to claim 1, wherein the fiber mat further comprises bico fibers.

5. The breakthrough resistant drywall structure according to claim 1, wherein the stud has two flange portions and the base portion having a width in a range of 50 mm (1.97 inches) to 150 mm (5.91 inches).

6. The breakthrough resistant drywall structure according to claim 1, wherein the building panel is a gypsum plasterboard of a thickness in a range of 9 mm (0.35 inches) to 25 mm (0.98 inches).

7. The breakthrough resistant drywall structure according to claim 1, wherein the filling material is arranged between the base portions of adjacent studs, wherein the filling material is capable of forming a resistance to a tool used for breaking through the drywall structure.

8. The breakthrough resistant drywall structure according to claim 1, wherein the fiber mat further comprises hemp hurds.

9. The breakthrough resistant drywall structure according to claim 8, wherein the fiber mat comprises equal amounts of hemp fibers and hemp hurds.

10. The breakthrough resistant drywall structure according to claim 1, wherein the plurality of building panels is arranged in two or more layers, each layer being directly or indirectly attached to the at least one flange portion.

11. The breakthrough resistant drywall structure according to claim 10, further comprising a sheet metal layer arranged in between of a respective said building panel and the flange portion to which the respective building panel is attached.

12. The breakthrough resistant drywall structure according to claim 11, wherein the sheet metal layer has a thickness in a range of from 0.2 mm (0.008 inches) to 0.5 mm (0.02 inches).

13. The breakthrough resistant drywall structure according to claim 1, wherein the fiber mat further comprises jute fibers, flax fibers, kenaf fibers, ramie fibers, polyester fibers, bico fibers, hemp hurds, nylon fibers, aramid fibers, PPBO fibers or any combinations thereof.

14. The breakthrough resistant drywall structure according to claim 13, wherein at least one of:
the fiber mat has a density of from 10 kg/m$^3$ (0.62 lbs/ft$^3$) to 500 kg/m$^3$ (31.21 lbs/ft$^3$), and
the fiber mat has a thickness in the range of from 20 mm (0.79 inches) to 200 mm (7.87 inches).

15. The breakthrough resistant drywall structure according to claim 13, wherein the fiber mat comprises hemp hurds, hemp fibers and bico fibers.

16. The breakthrough resistant drywall structure according to claim 15, wherein the fiber mat comprises around 45% by weight of hemp hurds, around 45% by weight of hemp fibers and around 10% by weight of bico fibers.

17. A kit for building a breakthrough resistant wall, comprising at least two said breakthrough resistant drywall structures according to claim 1.

18. A breakthrough resistant wall, comprising a plurality of said breakthrough resistant drywall structures according to claim 1.

19. A use of the breakthrough resistant drywall structure according to claim 1.

* * * * *